(12) United States Patent
Nemoto et al.

(10) Patent No.: US 10,358,042 B2
(45) Date of Patent: Jul. 23, 2019

(54) UNDERWATER MOBILE BODY

(71) Applicant: FUJI XEROX CO., LTD., Tokyo (JP)

(72) Inventors: Yoshihiko Nemoto, Kanagawa (JP); Tsutomu Kimura, Kanagawa (JP); Motofumi Baba, Kanagawa (JP); Masahiro Sato, Kanagawa (JP); Akihito Yamauchi, Kanagawa (JP); Kengo Tokuchi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/606,041

(22) Filed: May 26, 2017

(65) Prior Publication Data

US 2018/0099573 A1 Apr. 12, 2018

(30) Foreign Application Priority Data

Oct. 6, 2016 (JP) .................. 2016-198246

(51) Int. Cl.
| | |
|---|---|
| *B60L 11/12* | (2006.01) |
| *B61C 9/38* | (2006.01) |
| *B60L 11/18* | (2006.01) |
| *B63G 8/00* | (2006.01) |
| *B63G 8/08* | (2006.01) |
| *H02K 7/18* | (2006.01) |
| *B60L 53/36* | (2019.01) |

(52) U.S. Cl.
CPC ........... *B60L 11/1814* (2013.01); *B60L 53/36* (2019.02); *B63G 8/001* (2013.01); *B63G 8/08* (2013.01); *H02K 7/1823* (2013.01); *B60L 2200/32* (2013.01); *B60L 2240/62* (2013.01); *B63G 2008/002* (2013.01); *Y02T 10/7005* (2013.01); *Y02T 10/7072* (2013.01); *Y02T 10/7291* (2013.01); *Y02T 90/12* (2013.01); *Y02T 90/121* (2013.01); *Y02T 90/125* (2013.01); *Y02T 90/14* (2013.01); *Y02T 90/16* (2013.01); *Y02T 90/162* (2013.01)

(58) Field of Classification Search
CPC ....................................................... B60L 53/36
USPC ......................................................... 114/312
See application file for complete search history.

(56) References Cited

U.S. PATENT DOCUMENTS

| | | | | | |
|---|---|---|---|---|---|
| 4,615,292 | A | * | 10/1986 | Laukien | .................... B63B 1/12 114/312 |
| 5,446,529 | A | * | 8/1995 | Stettner | ................. G01S 7/4863 250/332 |
| 5,979,354 | A | * | 11/1999 | Arzola | ..................... B63G 8/00 114/312 |

(Continued)

FOREIGN PATENT DOCUMENTS

JP    2013-005593 A    1/2013

*Primary Examiner* — Tulsidas C Patel
*Assistant Examiner* — Thomas K Quigley
(74) *Attorney, Agent, or Firm* — Sughrue Mion, PLLC

(57) ABSTRACT

An underwater mobile body includes: a secondary battery; a detector that detects a remaining amount of electricity stored in the secondary battery; a power generation unit that uses natural energy to generate electricity with which the secondary battery is charged; and a transition unit that when the remaining amount of electricity detected by the detector decreases below a predetermined threshold, causes transition to a charge mode in which the secondary battery is charged.

2 Claims, 12 Drawing Sheets

(56) References Cited

U.S. PATENT DOCUMENTS

| | | | | |
|---|---|---|---|---|
| 6,065,418 A * | 5/2000 | Goldstein | ............... | H02S 10/30 114/312 |
| 6,802,749 B1 * | 10/2004 | Justus | ....................... | B60L 8/00 440/6 |
| 6,854,410 B1 * | 2/2005 | King | ....................... | B63G 8/001 114/244 |
| 7,000,560 B2 * | 2/2006 | Wingett | ................ | B63G 8/001 114/322 |
| 7,353,768 B1 * | 4/2008 | Jones | .................... | B63G 8/001 114/312 |
| 8,043,132 B1 * | 10/2011 | Wyant | ................... | B63H 21/20 440/1 |
| 8,065,972 B2 * | 11/2011 | Howard | ................. | H01L 35/00 114/337 |
| 9,845,137 B2 * | 12/2017 | Lelaurin | ................ | B63G 8/001 |
| 9,988,129 B2 * | 6/2018 | Jamieson | ................ | B63G 8/001 |
| 2003/0167998 A1 * | 9/2003 | Huntsman | ................ | B63G 8/08 114/312 |
| 2006/0054074 A1 * | 3/2006 | Wingett | ................. | B63B 22/18 114/312 |
| 2008/0144442 A1 * | 6/2008 | Combee | ................... | G01V 1/22 367/131 |

* cited by examiner

UNDERWATER MOBILE BODY

CROSS-REFERENCE TO RELATED APPLICATIONS

This application is based on and claims priority under 35 USC 119 from Japanese Patent Application No. 2016-198246 filed Oct. 6, 2016.

BACKGROUND

Technical Field

The present invention relates to an underwater mobile body.

SUMMARY

According to an aspect of the invention, there is provided an underwater mobile body including: a secondary battery; a detector that detects a remaining amount of electricity stored in the secondary battery; a power generation unit that uses natural energy to generate electricity with which the secondary battery is charged; and a transition unit that when the remaining amount of electricity detected by the detector decreases below a predetermined threshold, causes transition to a charge mode in which the secondary battery is charged.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the accompanying drawings.

<Exemplary Embodiment>
<Configuration of Underwater Drone>

Figure 1:
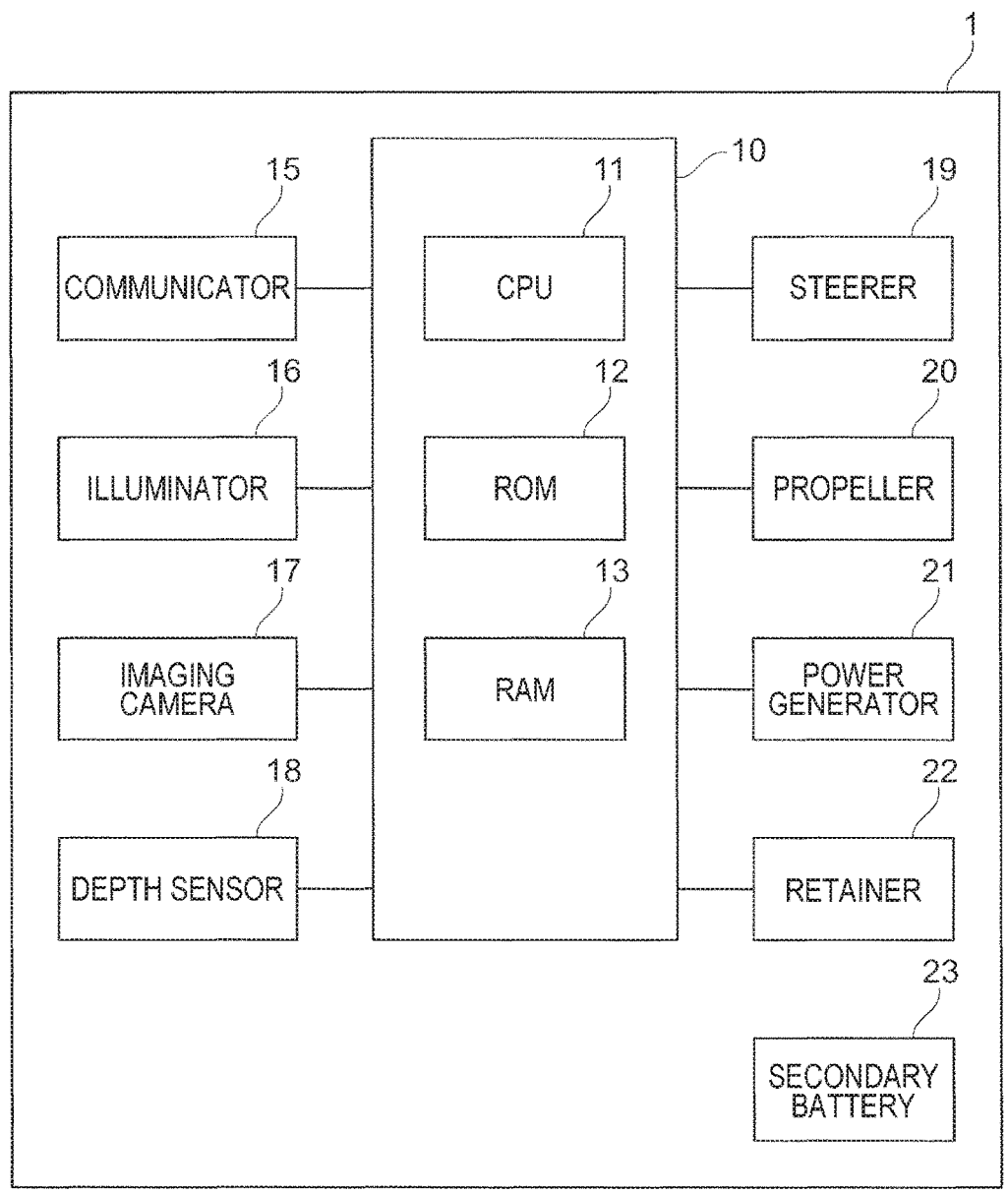
FIG. 1 is a diagram illustrating a configuration example of an underwater drone according to this exemplary embodiment.

FIG. 1 is a diagram illustrating a configuration example of an underwater drone 1 according to this exemplary embodiment. The underwater drone 1 is an example of an underwater mobile body, and more specifically, is a type of an unmanned underwater mobile body. The underwater drone 1 may be a remote control type or an autonomous navigation type. In this exemplary embodiment, an underwater drone of a remote control type is assumed. However, the details of control described later may be applied to an underwater drone of an autonomous navigation type.

The underwater drone 1 has a controller 10 that controls the units configuring the underwater drone 1, a communicator 15 that is used for communication with the outside, an illuminator 16 that illuminates an operating range, an imaging camera 17 that captures an image of an operating range, a depth sensor 18 that detects a depth utilizing a water pressure, a steerer 19 that is used for changing a movement direction, a propeller 20 that generates propulsive force, a power generator 21 that generates electric power internally of the underwater drone 1, and a secondary battery 23 that supplies electric power for operations to each unit.

In the underwater drone 1 according to this exemplary embodiment, functional units are connected to a controller 10 which is an example of a control unit. The functional units including the controller 10 are basically housed in a housing which adopts a waterproof structure. Electric power is supplied from the secondary battery 23 to the functional units including the controller 10. The secondary battery 23 is an example of a power source.

The controller 10 is configured by a central processing unit (CPU) 11, a read only memory (ROM) 12, and a random access memory (RAM) 13. The ROM 12 stores programs to be executed by the CPU 11. The CPU 11 reads a program stored in the ROM 12, and executes the program using the RAM 13 as a work area. The CPU 11 controls the functional units that configure the underwater drone 1, by the execution of each program.

The communicator 15 communicates with the outside wirelessly. In the case of this exemplary embodiment, a sound wave communicator that transmits and receives sound waves is used as the communicator 15. It is to be noted that as the communicator 15, a radio wave communicator that transmits and receives radio waves or an optical communicator that transmits and receives light may be used. It is to be noted that the underwater drone 1 may be equipped with multiple communicators, and may use the communicators selectively.

As the illuminator 16, for instance, a halogen lamp, a white light emitting diode (LED) or a color LED is used. The imaging camera 17 may be a camera that captures a still image or a camera that captures a dynamic image. A captured image is stored in the RAM 13, for instance.

The depth sensor 18 converts a detected water pressure to a depth, and outputs the depth to the controller 10. The accuracy of measurement of and resolution of the depth depend on the depth sensor 18. The movement direction is controlled by remote control or in accordance with a program executed by the controller 10. The movement direction includes not only a direction in a horizontal plane, but also a vertical direction (a surfacing direction and a descending direction). The propeller 20 is configured by, for instance, a propeller and a motor that rotates the propeller. The motor has a watertight structure to protect the inside from rusting. The propeller 20 is an example of a propulsive unit.

The power generator 21 in this exemplary embodiment also uses a mechanism of the propeller 20, and causes the above-described motor with the propeller rotatable by the force of water current to function as a power generator. In other words, the propeller 20 in this exemplary embodiment is used for generation of propulsive force in a normal mode, and is used for electric power generation in a charge mode.

A retainer 22 is a mechanism that in the charge mode, attaches and fixes the underwater drone 1 to a fixing target object as a target position determined in the surroundings of the underwater drone 1. The retainer 22 in this exemplary embodiment includes an anchor, a wire, and a wire wind-up mechanism. The wire wind-up mechanism is used for winding up the anchor after charging is completed. However, the anchor may be attached to the body surface of the underwater drone 1. In this case, the wire and the wire wind-up mechanism are unnecessary. In the case of this exemplary embodiment, as the fixing target object, a terrain at the water bottom, such as sand or a rock is assumed.

<Functional Configuration of Controller>

Figure 2:
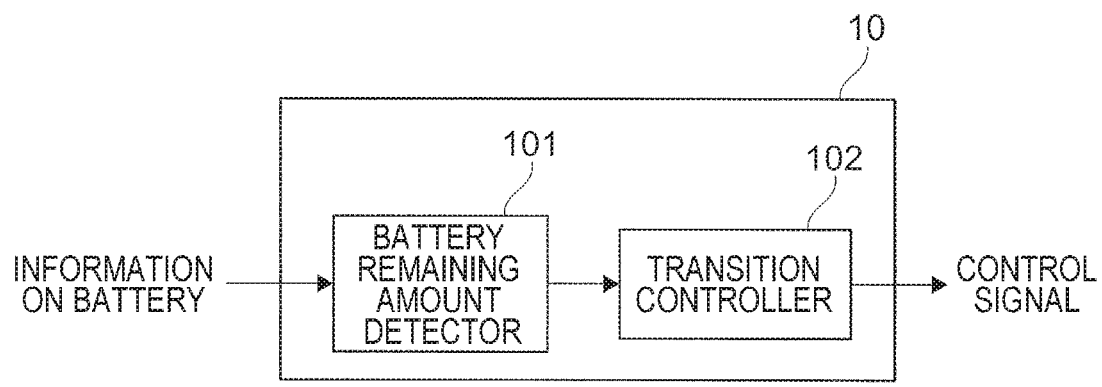
FIG. 2 is a block diagram illustrating an example of a functional configuration of a controller according to this exemplary embodiment.

Next, the functional configuration of the controller 10 will be described. FIG. 2 is a block diagram illustrating an example of a functional configuration of the controller 10 according to this exemplary embodiment. The controller 10 has a battery remaining amount detector 101, and a transition controller 102. The battery remaining amount detector 101 is an example of the detector, and the transition controller 102 is an example of the transition unit.

The battery remaining amount detector 101 obtains information (for instance, a temperature, a voltage, or a current) on the secondary battery 23 from the secondary battery 23, and detects a remaining amount of electricity stored in the secondary battery 23 based on the obtained information. The detected remaining amount is outputted from the battery remaining amount detector 101 to the transition controller 102.

The transition controller 102 compares the inputted remaining amount of electricity with a predetermined threshold Th, and determines an operation mode based on whether or not the remaining amount is greater than the predetermined threshold Th. When the remaining amount is greater than the threshold Th, the transition controller 102 determines use in the normal mode, and when the remaining amount is less than or equal to the threshold Th, the transition controller 102 determines switching to the charge mode.

The normal mode is a mode in which an operation based on remote control or a program is executed. For instance, an operation for underwater search is executed. In contrast, the charge mode is a mode in which the secondary battery 23 is charged with the electricity generated by the power generator 21. In the case of this exemplary embodiment, the charge mode is configured by a period of time 1 taken for moving the underwater drone 1 to a target position determined in the surroundings of the underwater drone 1, a period of time 2 taken for fixing the underwater drone 1 to a fixing target object as a target position, and a period of time 3 taken for charging the secondary battery 23.

In the period of time 1, the transition controller 102 determines that the target position is a terrain at the water bottom, such as a rock or sand in the surroundings of the underwater drone 1, and controls the steerer 19 and the propeller 20 so as to move the underwater drone 1 closer to the target position. In the period of time 2, the transition controller 102 drops the anchor from the underwater drone 1, and hooks the anchor on a rock or sand. In the period of time 3, the transition controller 102 instructs the power generator 21 to charge the secondary battery 23 with generated electricity. In the case of this exemplary embodiment, the propeller of the propeller 20 is also used by the power generator 21, and thus power generation is started by rotation of the propeller by water current. The electricity generated by the power generator 21 is utilized for charging the secondary battery 23.

Figure 3:
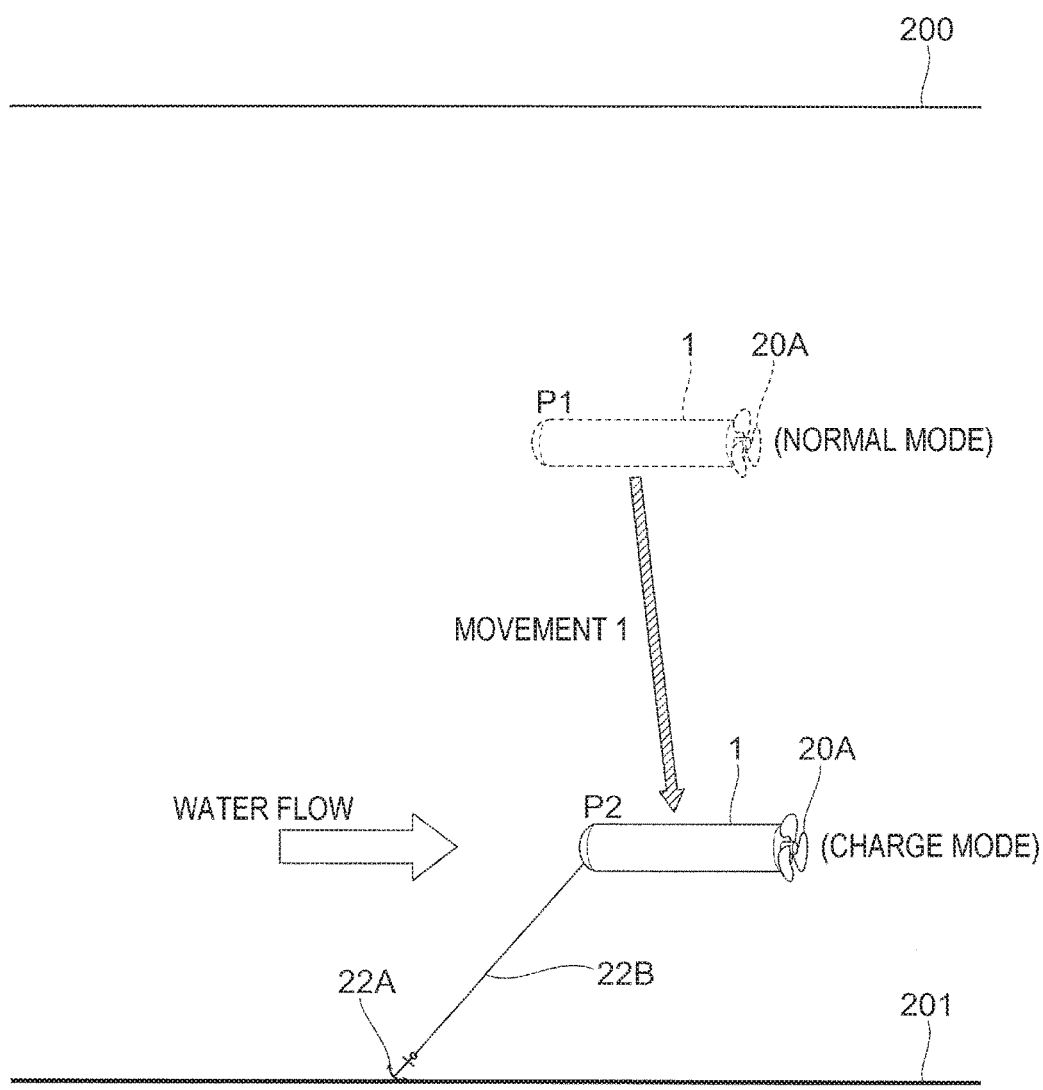
FIG. 3 is an illustration for explaining switching between operation modes of an underwater drone.

FIG. 3 is an illustration for explaining switching between operation modes of the underwater drone 1. In FIG. 3, a symbol 200 indicates the water surface, and a symbol 201 indicates the water bottom (for instance, a rock or sand). The underwater drone 1 in action at a position P1 is operating in the normal mode. The underwater drone 1 operating in the normal mode rotates a propeller 20A to generate propulsive force and moves underwater. When the remaining amount of the secondary battery 23 decreases below the threshold Th, the underwater drone 1 starts to move (movement 1) toward the water bottom 201. When being close to a position P2, the underwater drone 1 extends a wire 22B from the body and fixes an anchor 22A to the water bottom 201.

When intense water current is present along the surface of the water bottom 201, the propeller 20A of the underwater drone 1 fixed to the water bottom 201 is rotated by the force of the water current and the motor starts power generation. When the charging of the secondary battery 23 with the generated electricity is completed, the underwater drone 1 is moved forward against the water current to remove the anchor 22A from the he bottom of water, and the underwater drone 1 is collected by winding up the wire 22B. Subsequently, the underwater drone 1 returns to the normal mode, and resumes the underwater operation.

<Processing Steps Executed by Underwater Drone>

Figure 4:
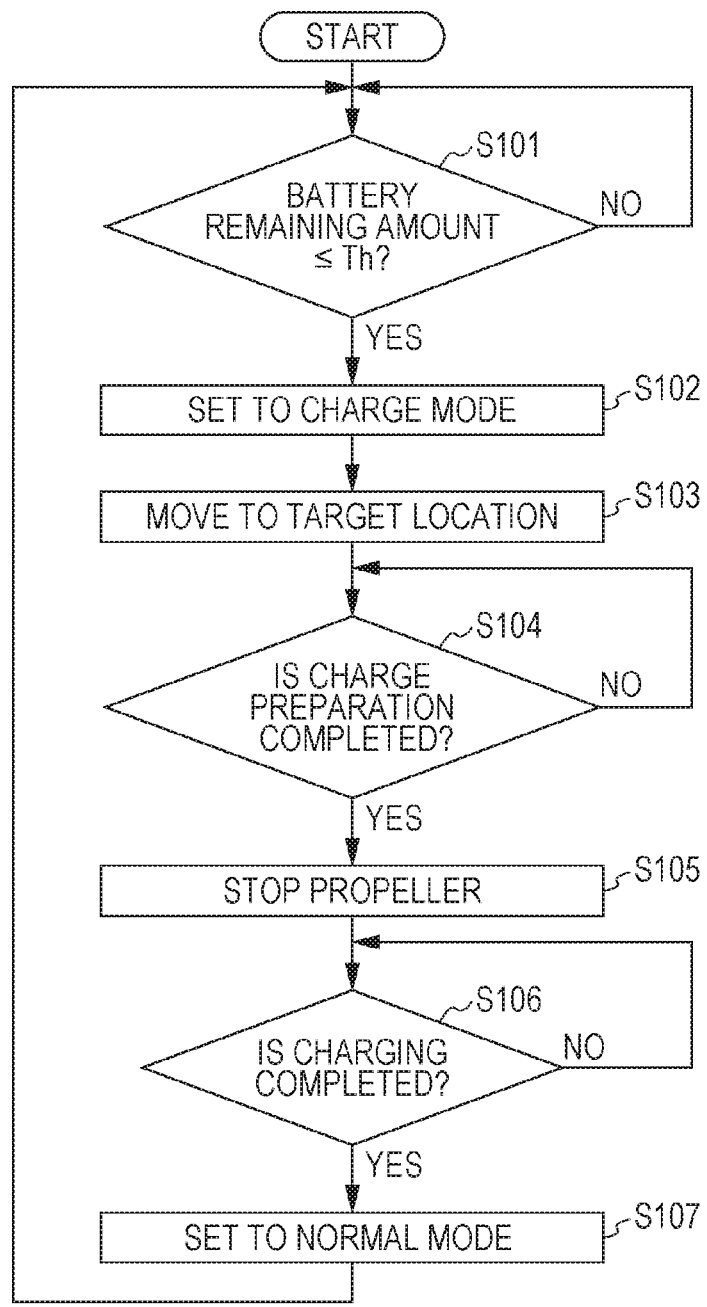
FIG. 4 is a flowchart illustrating an example of processing steps executed by the controller according to this exemplary embodiment.

Next, the processing steps executed by the controller 10 of the underwater drone 1 according to this exemplary embodiment will be described. FIG. 4 is a flowchart illustrating an example of processing steps executed by the controller 10 (transition controller 102) according to this exemplary embodiment. The controller 10 repeats the processing of the flowchart illustrated in FIG. 4.

First, the transition controller 102 determines whether or not the battery remaining amount is less than or equal to threshold Th (step 101). The threshold Th is set in advance according to the type or the capacity size of the secondary battery 23 used. As long as a negative result is obtained in step 101 (in other words, during the normal mode), the transition controller 102 repeats the determination.

When an affirmative result is obtained in step 101, the transition controller 102 sets the operation mode of the underwater drone 1 to the charge mode (step 102). Subsequently, the transition controller 102 causes the underwater drone 1 to move to a target position determined in the surroundings of the underwater drone 1 (step 103). In the case of this exemplary embodiment, the transition controller 102 causes the underwater drone 1 to move to sand or a rock present in the surroundings of the underwater drone 1.

Subsequently, the transition controller 102 determines whether or not preparation for charging is completed (step 104). The preparation for charging is completed by fixing the anchor 22A to the water bottom 201. The transition controller 102 detects that the underwater drone 1 is fixed to the water bottom 201 by a change in the external force applied to the wire 22B. As long as a negative result is obtained in step 104, the determination in step 104 is repeated because the preparation for charging is not completed.

When an affirmative result is obtained in step 104, the transition controller 102 stops the propeller 20 (step 105). Specifically, energization from the secondary battery 23 to the motor is stopped. Subsequently, the transition controller 102 separates the shaft of the propeller 20A from the propeller 20, and couples the shaft to the power generator 21. The power generator 21 starts power generation by the rotation of the propeller 20A due to water current, and charges the secondary battery 23 with the generated electricity. The transition controller 102 determines whether or not the charging is completed (step 106). Completion of charging is detected by whether or not the predetermined threshold Th1 is exceeded by the detected remaining amount of the battery. As long as a negative result is obtained in step 106, the determination operation of step 106 is repeated because the charging is not completed.

When the charging is completed and an affirmative result is obtained in step 106, the transition controller 102 sets the operation mode of the underwater drone 1 to the normal mode (step 107). Subsequently, the transition controller 102 returns to step 101, and resumes monitoring of the remaining amount of the secondary battery 23.

As described above, the underwater drone 1 according to this exemplary embodiment is equipped with the power generator 21 that generates power by the force of water current, and when the remaining amount of the secondary battery 23 decreases below the threshold Th, the underwater drone 1 moves to the water bottom 201 present in the surroundings of the underwater drone 1, drops the anchor 22A, generates electric power by the force of water current, and charges the secondary battery 23. That is, the underwater drone 1 according to this exemplary embodiment charges the secondary battery 23 while staying in an operating range, and upon completion of the charging, resumes the operation.

In other words, since the underwater drone 1 is moved to the water bottom 201 present in the surroundings of the underwater drone 1 and the secondary battery 23 is charged in this exemplary embodiment, it is unnecessary to move the underwater drone 1 precisely to a specific position where a power generation device is provided. Moreover, when the object of operation is underwater search, or construction, maintenance, or inspection of underwater equipment, the water bottom 201 is often present near the operating range, and thus a movement time before charging is started tends to be short. Also, even when the weather on the water surface is not suitable to wind power generation or solar power generation, the underwater drone 1 can charge the secondary battery 23 underwater, and is not affected by the weather. For this reason, the underwater operation time of the underwater drone 1 is stably extended.

<Other Exemplary Embodiments>
First Modification

Figure 5:
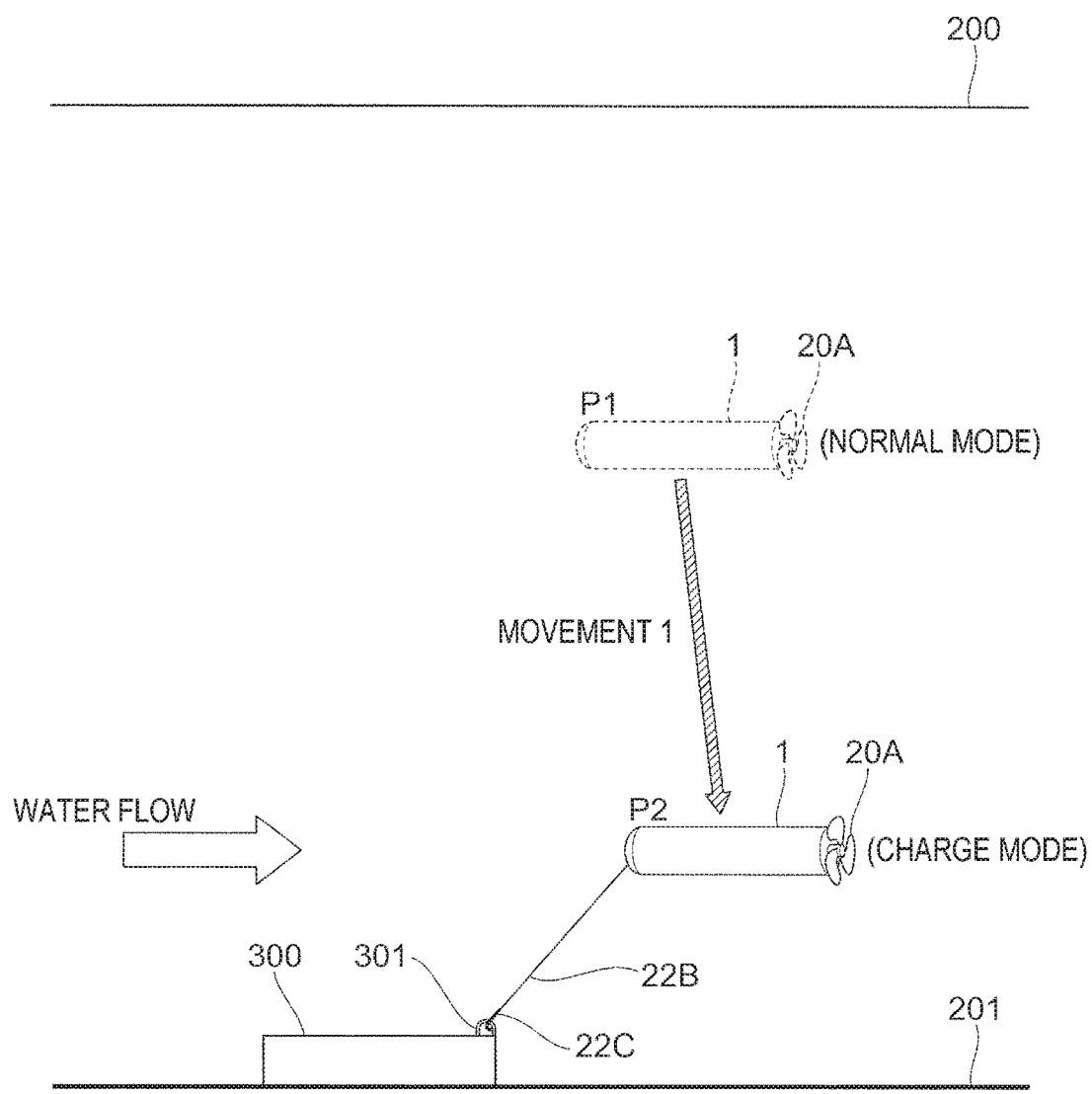
FIG. 5 is an illustration for explaining an example in the case where equipment installed underwater is used as a charge site.

Although the anchor 22A is dropped to the water bottom 201 such as a rock or sand, and the secondary battery 23 of the underwater drone 1 is charged in the above-described exemplary embodiment, the secondary battery 23 may be charged with the underwater drone 1 fixed to equipment installed underwater. FIG. 5 is an illustration for explaining an example in the case where equipment 300 installed at the water bottom 201 is used as the target position to be used for charging. The equipment 300 is provided with a fastener 301 (for instance, U-shaped metal fittings) 22. In the case of the example of FIG. 5, the underwater drone 1 is fixed so that a hook 22C attached to the leading end of the wire 22B is hooked on the fastener 301.

It is to be noted that in the example of FIG. 5, the hook 22C of the underwater drone 1 is hooked on the U-shaped metal fittings provided in the equipment 300. However, a configuration may be adopted in which the equipment 300 is provided with a wire or a hook and the U-shaped metal fittings are provided in the underwater drone 1.

Second Modification

Figure 6:
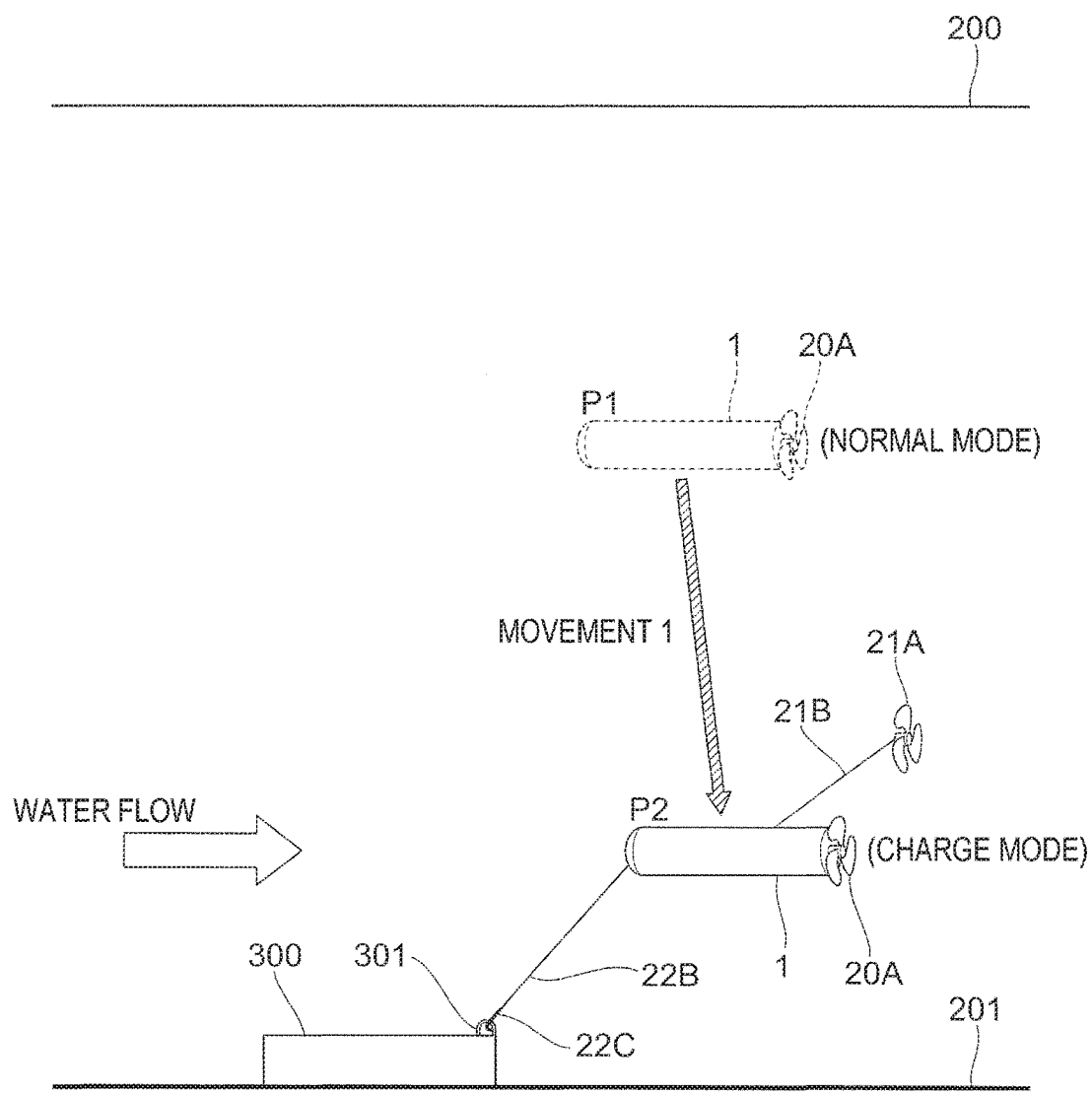
FIG. 6 is an illustration for explaining an example of an underwater drone that is equipped with a propeller dedicated for power generation in addition to a propeller for propulsive force.

Although the propeller 20A partially configuring the propeller 20 is also used as a propeller for power generation in the above-described exemplary embodiment, the propeller for power generation may be prepared separately from the propeller 20A for propulsive force. FIG. 6 is an illustration for explaining an example of the underwater drone 1 that is equipped with the propeller 21A dedicated for power generation in addition to the propeller 20A for propulsive force. Also in the case of FIG. 6, the underwater drone 1 in the charge mode is fixed to the equipment 300 provided on the water bottom 201.

A power generator (not illustrated) is mounted on the shaft of the propeller 21A, and the power generator generates electric power by rotation of the propeller 21A due to water current. Here the propeller 21A and the power generator are each an example of the power generator. The generated electricity is supplied to the secondary battery 23 through a cable 21B. It is to be noted that in the normal mode, the propeller 21A, the power generator, and the cable 21B are stored in the underwater drone 1.

Third Modification

Figure 7:
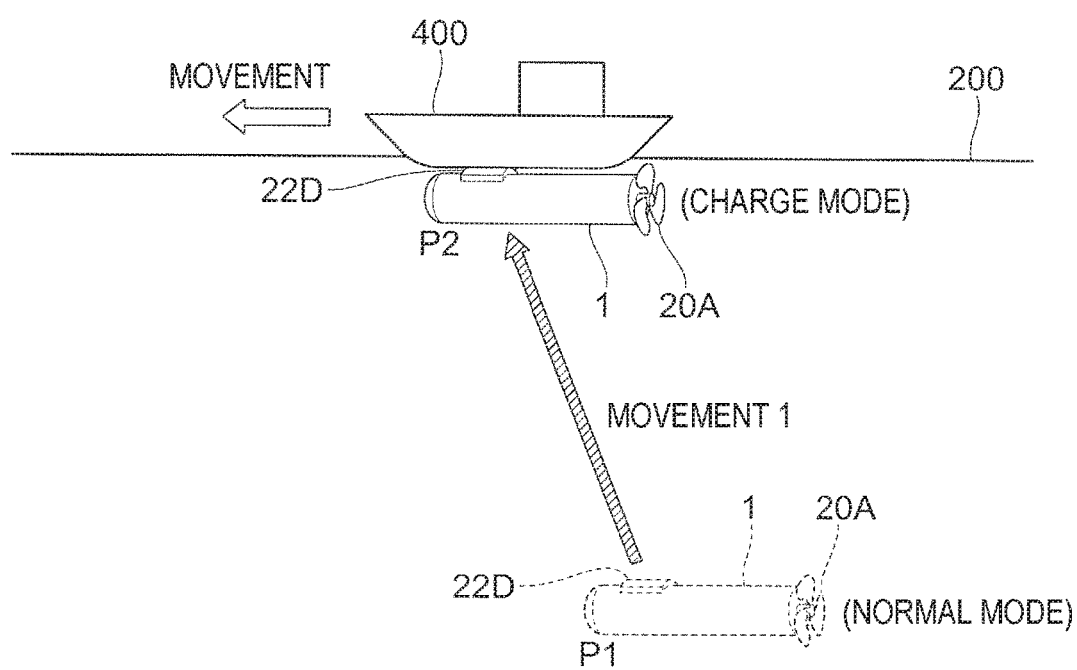
FIG. 7 is an illustration showing an example in which an underwater drone clings to a ship for charging a battery.

Although the underwater drone 1 moves to the water bottom 201, and charges the secondary battery 23 in the above-described exemplary embodiment, the underwater drone 1 may cling to a mobile object such as a ship, an underwater creature, or a driftwood which are moving in the surroundings of the underwater drone 1, and may charge the secondary battery 23. The mobile object here is an example of the fixing target object. FIG. 7 is an illustration showing an example in which the underwater drone 1 clings to a ship 400 for charging the battery. In the case of this example, the underwater drone 1 clings to the bottom of the ship 400 by a sucker 22D which is an example of a fixing unit. In this case, the propeller 20A is rotated by the water current generated by the movement of the ship 400, and electric power is generated. Adoption of this mechanism allows the secondary battery 23 to be charged even in a water area with few water currents. It is to be noted that the sucker 22D is not likely to damage the outer skin of an underwater creature.

In the example of FIG. 7, the sucker 22D is used as an example of a retaining unit. However, the underwater drone 1 may be fixed to another mobile object using a fastener and a hook as described in the above-described modification. A mobile object as the fixing target object is discovered, for instance, by processing a captured image by the transition controller 102. In the case of this example, the transition controller 102 may determine that the discovered mobile object is a fixing target object based on whether or not the mobile object satisfies predetermined conditions. For instance, a size or a type is used for the predetermined conditions.

Fourth Modification

Figure 8:
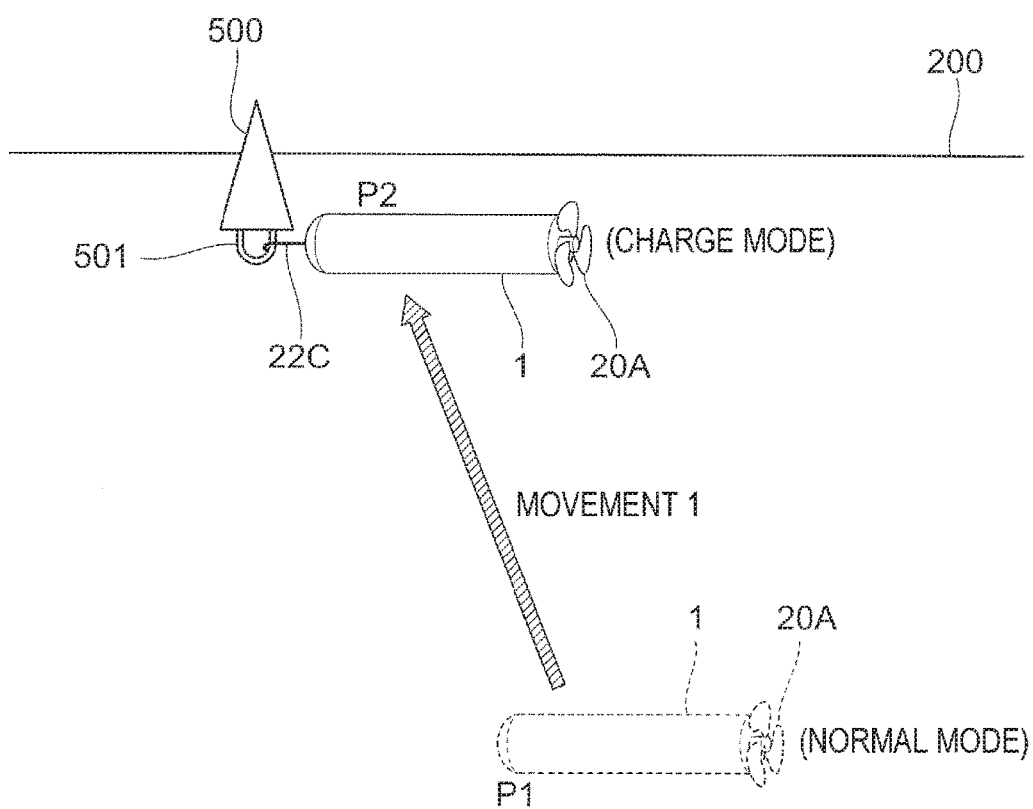
FIG. 8 is an illustration for explaining an example in which an underwater drone is fixed to a buoy floating on a water surface.

Although the water bottom 201, the equipment 300, and the ship 400 have been presented as examples of the fixing target object in the above-described exemplary embodiment, a buoy may be used as the fixing target object. FIG. 8 is an illustration for explaining an example in which the underwater drone 1 is fixed to a buoy 500 floating on a water surface 200. In the example of FIG. 8, the underwater drone 1 is fixed so that the hook 22C provided at the leading end of the underwater drone 1 is hooked on the fastener 501 provided in the lower surface of the buoy 500.

It goes without saying that the buoy 500 and the underwater drone 1 may be fixed together by another technique. For instance, a hook-shaped fastener may be provided in the buoy 500. Alternatively, for instance, the buoy 500 and the underwater drone 1 may be fixed together using a sucker. In the example of FIG. 8, the underwater drone 1 is fixed to the buoy 500 floating on the water surface 200. However, the underwater drone 1 may be fixed to a buoy that floats underwater (including the water bottom).

Fifth Modification

Figure 9:
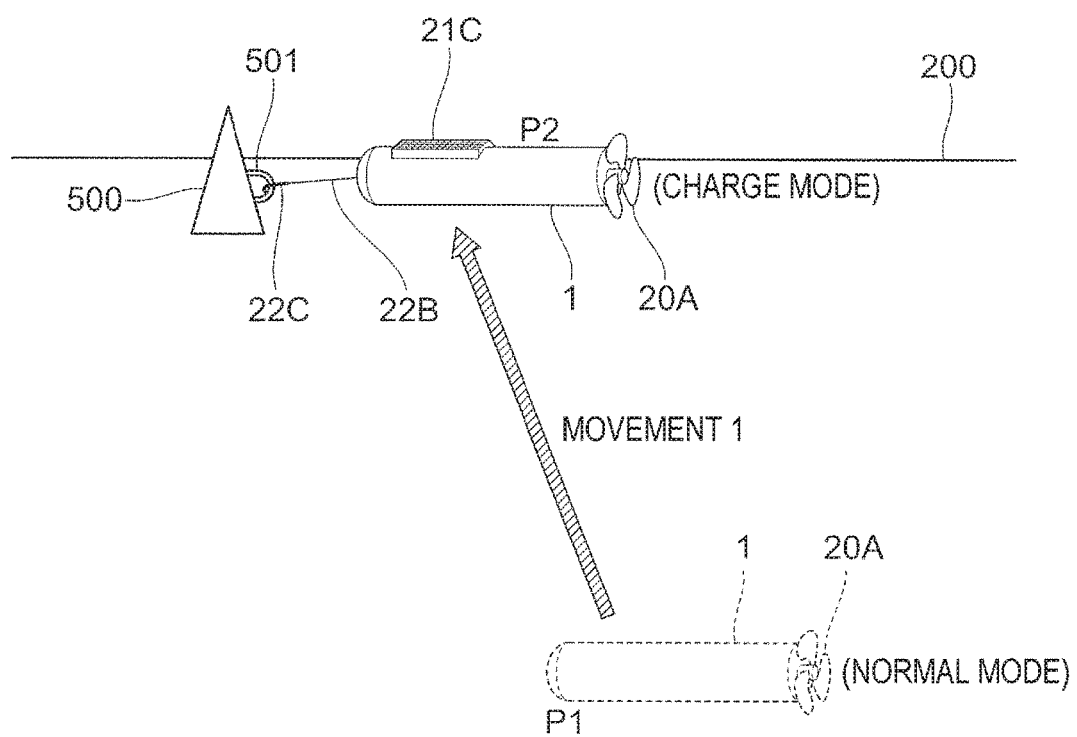
FIG. 9 is an illustration for explaining an example in which electric power is generated using sunlight.

Although electric power is generated using the water current in the above-described exemplary embodiment, electric power may be generated using another natural energy. FIG. 9 is an illustration for explaining an example in which electric power is generated using the sunlight. In the example of FIG. 9, the hook 22C of the underwater drone 1 is attached to the fastener 501 of the buoy 500 floating on the water surface 200. The hook 22C is connected to the underwater drone 1 via the wire 22B.

After completion of the attachment, the underwater drone 1 stops the propeller 20, and charges the secondary battery 23 with the electricity generated by a solar panel 21C. The solar panel 21C may be affixed to the surface of the underwater drone 1, or a configuration may be adopted in which the solar panel 21C is stored in the body in the charge mode at least.

In the example of FIG. 9, the underwater drone 1 in the charge mode is fixed to the buoy 500 floating on the water surface 200. However, the underwater drone 1 may float on the water surface 200 independently. That is, the underwater drone 1 in the system that generates power by the sunlight may charge the secondary battery 23 without being fixed to a floating object such as the buoy 500.

Sixth Modification

Although water current or the sunlight is utilized as natural energy in the above-described exemplary embodiment and modifications, wave power may be utilized. For the power generator 21 utilizing wave power, a system called an air turbine type, or a system called a gyro system may be used.

Seventh Modification

Figure 10:
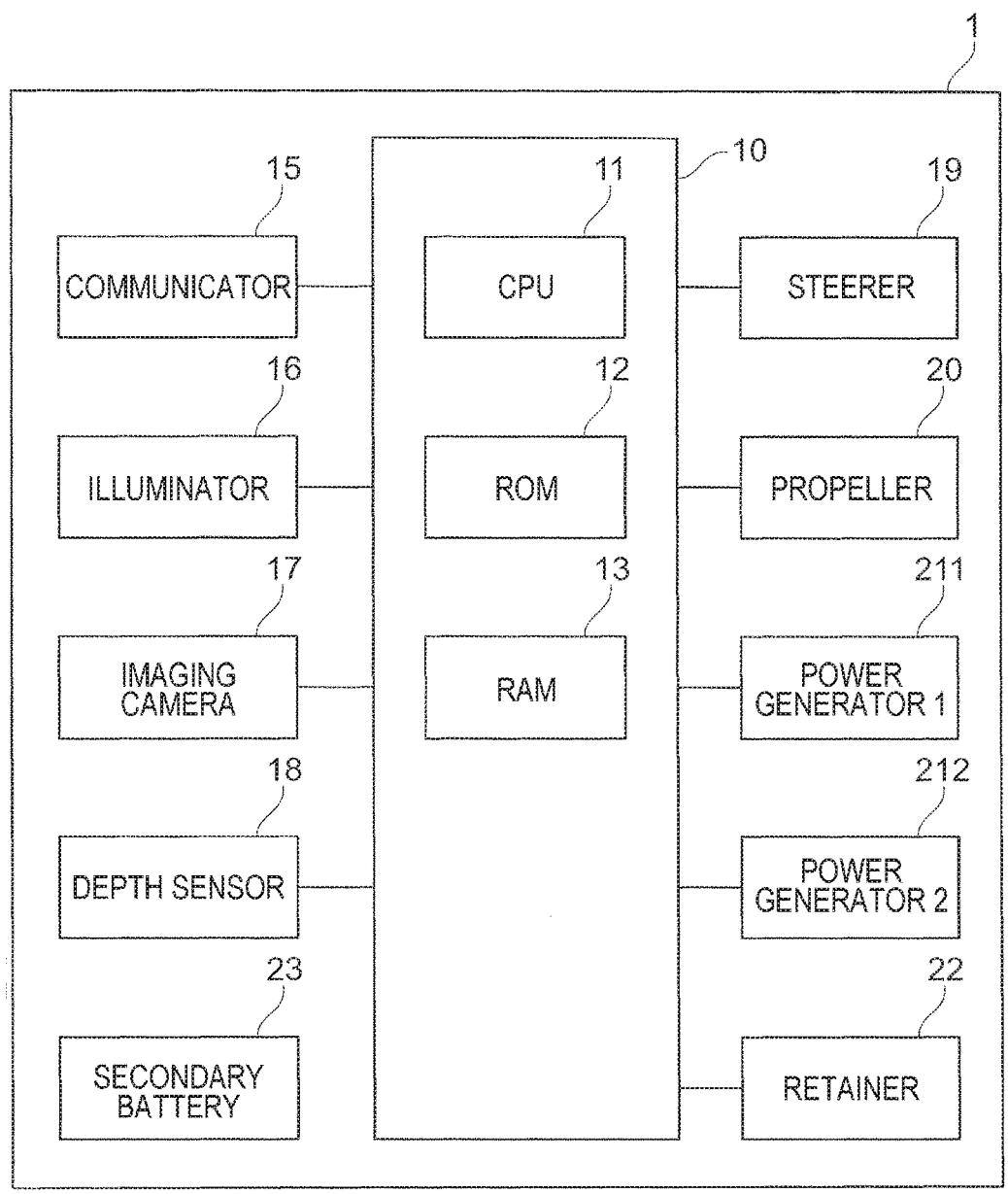
FIG. 10 is a diagram illustrating a configuration example of an underwater drone equipped with multiple types of power generators.

In the above-described exemplary embodiment, the case where the underwater drone 1 is equipped with a single power generator 21 of one type has been described. However, the underwater drone 1 may be equipped with multiple power generators 21 of one type. Also, the underwater drone 1 may be equipped with multiple types of the power generator 21. FIG. 10 is a diagram illustrating a configuration example of the underwater drone 1 equipped with multiple types of power generators. The underwater drone 1 illustrated in FIG. 10 is equipped with a power generator 211 (power generator 1) corresponding to a first power generation system and a power generator 212 (power generator 2) corresponding to a second power generation system. It goes without saying that the underwater drone 1 may be equipped with three or more types of power generators.

Figure 11:
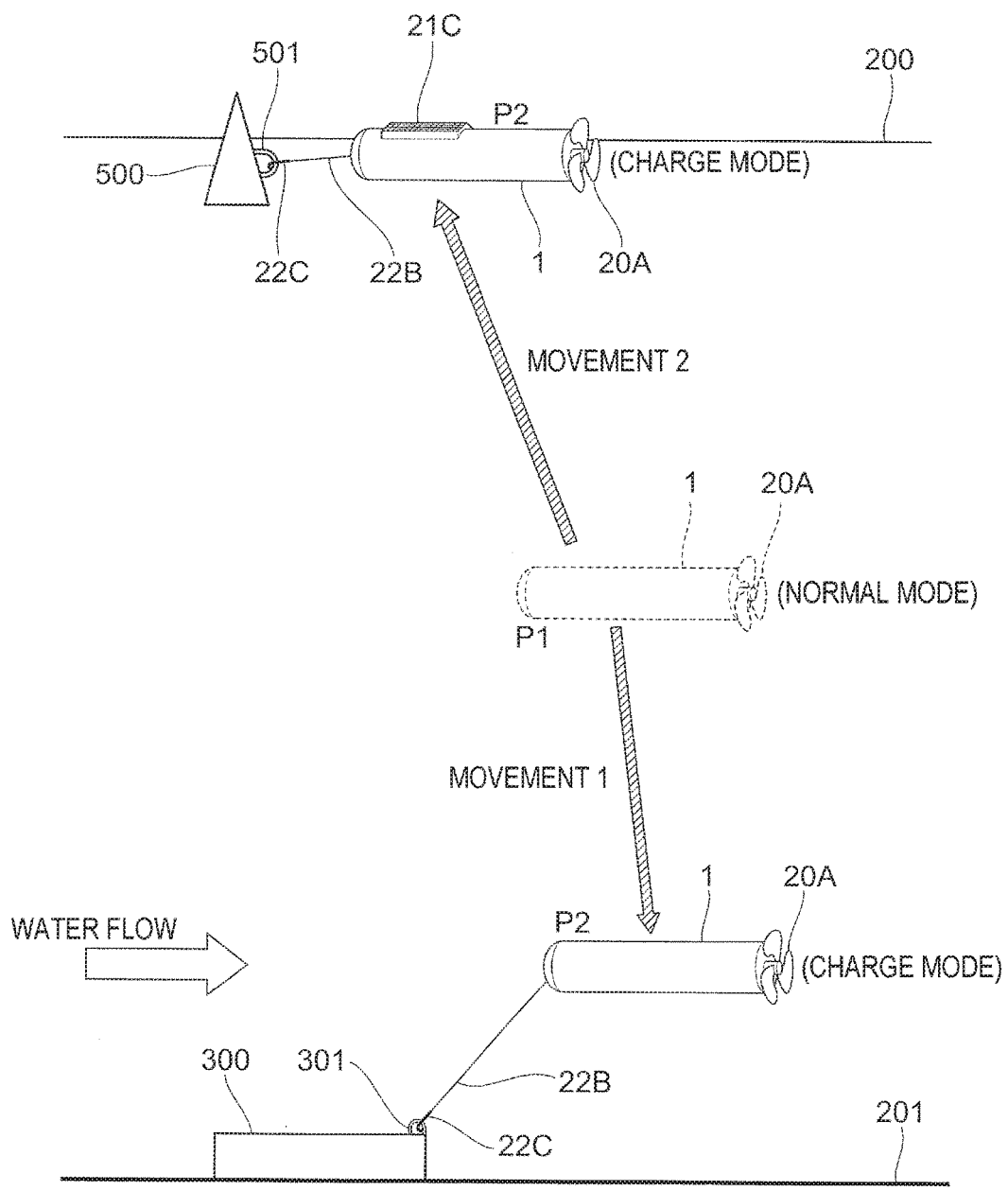
FIG. 11 is an illustration for explaining a use example of an underwater drone equipped with power generators corresponding to a power generation system utilizing the force of water current and a power generation system utilizing the sunlight.

FIG. 11 is an illustration for explaining a use example of the underwater drone 1 equipped with power generators corresponding to a power generation system utilizing the force of water current and a power generation system utilizing the sunlight. As illustrated, the underwater drone 1 charges the secondary battery 23 with the electric power generated by either one of the systems.

As illustrated in FIG. 11, the depth and the position used for charging are different between the power generation system utilizing the force of water current and the power generation system utilizing the sunlight. For this reason, the underwater drone 1 which has caused transition to the charge mode has to move to a target position according to the relevant power generation system. In the example of FIG. 11, the distance (movement 2) of movement from the operating range to the water surface 200 is shorter than the distance (movement 1) of movement from the operating range to the water bottom 201. Also, the power generation efficiency which affects a charging rate varies with the intensity of the sunlight and the strength of water current which are used for power generation, in addition to a power generation system. For this reason, the total charge time during the period since transition to the charge mode until the normal mode is resumed is not determined by the movement distance only.

Figure 12:
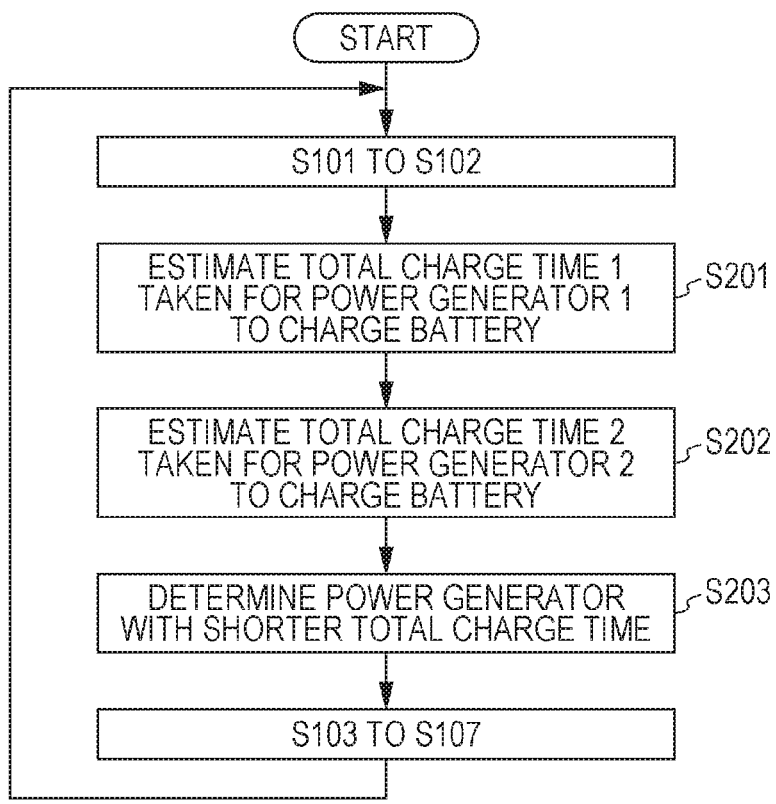
FIG. 12 is a flowchart illustrating an example of processing steps executed by the controller when multiple power generators are selectively used.

Since a shorter total charge time is desired to achieve a longer operation time, the transition controller 102 in this example determines a power generation system (type of power generator) used for charging by the following steps. FIG. 12 is a flowchart illustrating an example of processing steps executed by the controller 10 (the transition controller 102) when multiple power generators are selectively used.

First, the transition controller 102 performs the processing in steps 101 and 102 illustrated in FIG. 4, and causes transition to the charge mode. Subsequently, the transition controller 102 estimates a total charge time 1 taken for charging the battery when the first power generator (here, the power generator 211) generates power (step 201). The total charge time is given as the sum of a time taken for moving (movement time) from the current position to a target position determined in the surroundings of the underwater drone 1, and a time taken for charging the secondary battery 23.

For estimation of a time taken for charging, the transition controller 102 refers to a power generation efficiency which is determined according to a power generation system to be used. At this point, it is desirable to use environmental information (such as a current speed, the intensity of the sunlight) on the surroundings of the underwater drone 1, detected by various sensors to increase the estimation accuracy. Alternatively, environmental information may be obtained from the outside via communication and used.

Subsequently, the transition controller 102 estimates a total charge time 2 taken for charging the battery when the second power generator (here, the power generator 212) generates power (step 202). It is to be noted that estimation processing of the total charge time of each of two types of power generation systems may be performed in parallel.

Subsequently, the transition controller 102 determines a power generator with a shorter total charge time taken for charging (step 203). For instance, it is determined that a power generator corresponding to the solar power generation system is used. Subsequently, the transition controller 102 performs the processing in steps 103 to 107 in FIG. 4, and upon completion of the charging, causes transition to the normal mode and resumes the operation.

It is to be noted that in the above-described example, either one of the multiple types of equipped power generation systems is selectively used. However, electric power may be generated using both power generation systems depending on a combination of equipped power generation systems. For instance, electric power may be generated by wave power while electric power is generated by the sunlight.

Eighth Modification

Although the underwater drone 1 is equipped with the communicator 15, the illuminator 16, and the imaging camera 17 in the above description, the functions to be equipped vary with applications. Also, although the retainer 22 is controlled by the controller 10 in FIGS. 1 and 10, in the case where the retainer 22 has a structure (for instance, a hook) for which no control is necessary, control of the retainer 22 by the controller 10 is unnecessary.

Although the exemplary embodiments of the invention have been described so far, the technical scope of the present invention is not limited to the scope described in the embodiments. It is apparent from the description of the claims that various modifications or improvements of the embodiments are also included in the technical scope of the present invention.

What is claimed is:

1. An underwater mobile body comprising:
   a secondary battery;
   a detector that detects a remaining amount of electricity stored in the secondary battery;
   a power generation unit that uses natural energy to generate electricity with which the secondary battery is charged;
   a transition unit configured to, in response to the remaining amount of electricity detected by the detector decreasing below a predetermined threshold, causing a transition to a charge mode in which the secondary battery is charged,
   wherein when a plurality of types of the power generation unit are mounted as the power generation unit, the transition unit estimates a total charge time of each of the plurality of types of the power generation unit, and determines a power generation unit used for charging according to a result of the estimation.

2. The underwater mobile body according to claim 1, wherein the transition unit estimates the total charge time based on a movement time taken for movement of the underwater mobile body from a current position to a target position determined in surroundings of the underwater drone, and a power generation efficiency according to a type of the power generation unit.

* * * * *